Aug. 4, 1942.  H. NEUWIRTH  2,291,747
TRIPOD
Filed Oct. 1, 1940
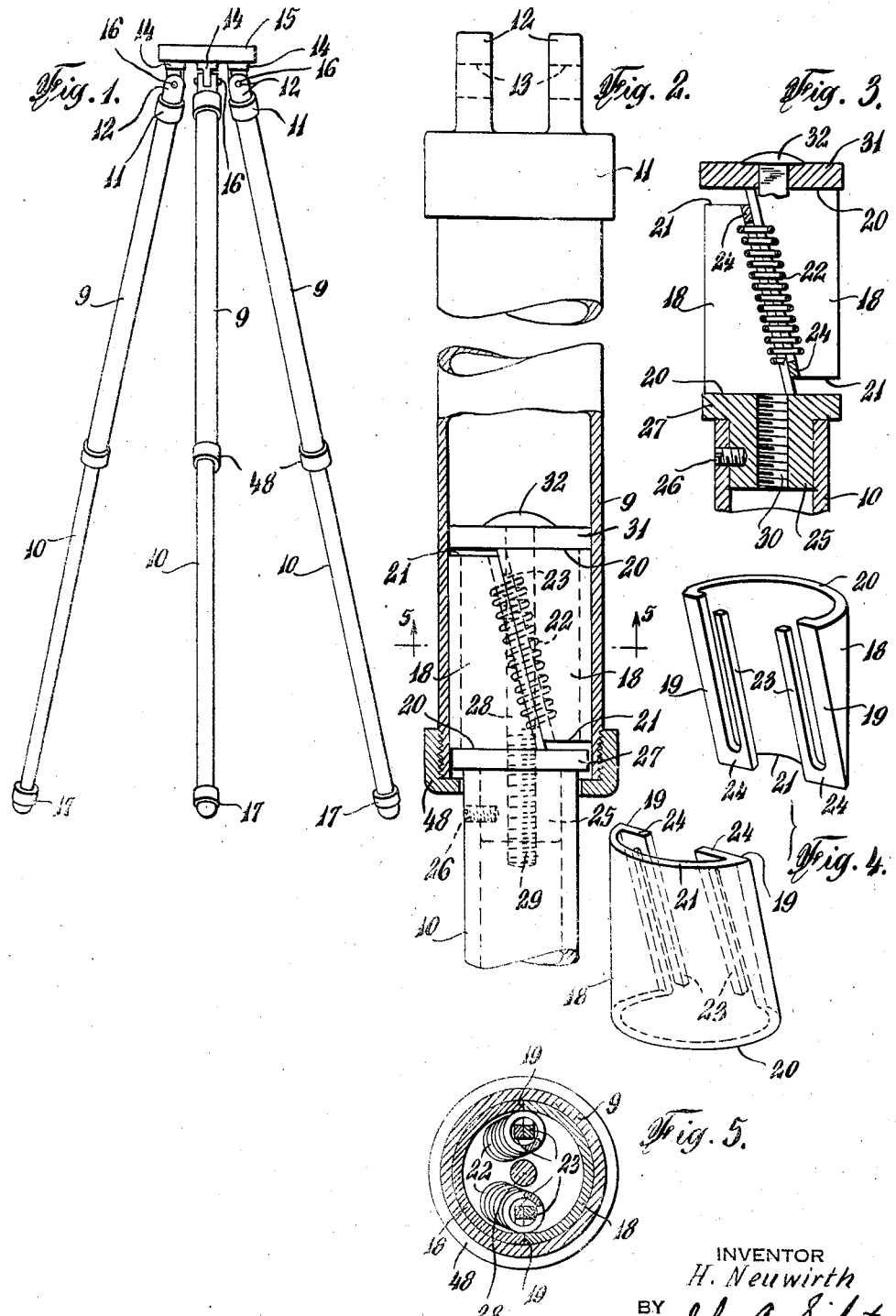
INVENTOR
H. Neuwirth
BY John A. Seifert
ATTORNEY Patented Aug. 4, 1942

2,291,747

UNITED STATES PATENT OFFICE 2,291,747

TRIPOD

Herman Neuwirth, Brooklyn, N. Y., assignor to Testrite Instrument Company, Inc., New York, N. Y., a corporation of New York Application October 1, 1940, Serial No. 359,184

8 Claims. (Cl. 248—191)

This invention relates to tripods for supporting cameras or other similar instruments and having telescoping leg sections of successively increased diameter adapted to be adjusted to desired lengths for the purposes of varying the height of the tripod while in use and to place the tripod in condition to be transported or stored, and particularly to means for securing the leg sections in adjusted positions relative to their lengths.

It has been the common practice to secure the adjustable sections of the supporting legs of tripods in predetermined positions relative to their lengths by means of set screws or a nut actuated chuck adjustably mounted on the leg section of larger diameter, whereby the securing means is on the exterior of the leg section which will detract from the appearance thereof and provide an objectionable obstruction. Furthermore, it is necessary to hold the leg sections in adjusted position while the securing means is actuated to secure said leg sections which is awkward and interferes with the adjusting of the sections of all the legs of a tripod to the same length.

It is the principal object of the invention to provide means to secure together tubular sections of the supporting legs of a tripod which means is within the leg sections in the assembled condition of said leg sections and which is actuated by the rotation of one of the leg sections, so that all of the disadvantages of the present means for securing the leg sections in predetermined positions relative to their lengths have been overcome.

It is another object of the invention to provide an expansible member adjustably mounted on the end of a leg section engaged in a leg section of larger diameter and adapted to be spread or expanded into impingement with the inner surface of the leg section of larger diameter by the rotation of the leg section of smaller diameter.

It is a further object of the invention to provide an expansible member for securing telescoping sections to each other which is inexpensive to manufacture and comprises like mating portions yieldingly connected to each other and urged to predetermined position and connected to one of said sections by a member adjustable by the rotation of said section to expand said mating portions into impingement with the other telescoping section.

Another object of the invention is to provide an expansible member to secure telescoping sections to each other which is of a material different than the material of the telescoping sections to increase the friction between the expansible member and the leg sections in the securing position of the expansible member.

Other objects and advantages of the invention will be set forth in the detail description of the invention.

In the drawing accompanying and forming a part of the application, Figure 1 is a view of a tripod having the sections of the supporting legs thereof adjusted to support a desired instrument.

Figure 2 is a fragmentary view, on an enlarged scale, of the sections of a tripod supporting leg with the leg section of larger diameter in section to show an expansible member carried by the leg section of smaller diameter in expanded condition to secure the leg sections in adjusted position relative to their lengths.

Figure 3 is a longitudinal section of the expansible member shown in Figure 2 in normal condition relative to the leg section of smaller diameter and the means for connecting the expansible member to the leg section of smaller diameter broken away to show the structure of the expansible member.

Figure 4 is a perspective view of mating portions of the expansible member separated from each other to more fully show the structure thereof.

Figure 5 is a cross sectional view taken on the line 5—5 of Figure 2 looking in the direction of the arrows to show means to yieldingly connect the mating portions of the expansible member to each other.

The embodiment of the invention is illustrated in the accompanying drawing in connection with a tripod comprising three supporting legs, each leg consisting of a plurality of telescoping leg sections and shown in the present instance as composed of two tubular sections 9 and 10 of proportionally or successively increased diameters, the sections 9 of greater diameter having a cap member 11 fixed on the upper end thereof and arranged with a pair of spaced parallel ears 12 extending perpendicularly from the closed end of the cap and having alined perforations, as shown at 13 in Figure 2. The ears 12 are adapted to be engaged on opposite sides of ears 14 fixed to and extended from the under face of the head or top 15 arranged to support a camera or other similar instrument and the ears 12 and 14 are pivotally connected to each other by a pin engaged in the perforations 13 and an alined perforation in the ears 14, as shown at 16 in Figure 1. It is to be understood that the mounting of the legs on the head 15 and the structure of the head may be of any conventional form as said mounting and head do not constitute a part of this invention.

The upper portion of the lower leg sections 10 of reduced diameter is slidably engaged in the lower end of the leg sections 9 and the lower end of the leg sections 10 is arranged with a suitable support engaging foot 17 mounted on said end, as shown in Figure 1. The leg sections 9 and 10 are shown as of cylindrical tube form but may be of square tube form without digressing from the invention.

The embodiment of the invention comprises means to secure the leg sections 9 and 10 in predetermined position relative to their lengths in the form of an expansible and contractible member adapted to be adjusted to positions to secure the leg sections to each other or to release and permit longitudinal movement of the leg sections 10 into or out of the leg sections 9 to vary the lengths of the legs by rotating the leg sections 10 in opposite directions. The expansible member comprises a plurality of like portions 18 of arcuate shape in cross section and shown in the present instance to be two in number, but the number of said portions may be greater than two depending on the inner diameter of the leg sections 9 and the weight to be supported by the tripod. The longitudinal marginal edge portions of the portions 18 are flanged inwardly and arranged with mating surfaces extending at an oblique angle to the longitudinal axis of said portions, as at 19, so that the portions 18 will be of wedge form with one end 20 extending through a greater arc than the other end 21, as shown in Figure 4, and the longitudinal movement of the portions 18 in opposite directions relative to each other will position the portions to form circles of different diameters, a circle of greatest diameter being formed when the ends 21, 20 of one portion 18 are in the same horizontal planes as the ends 20, 21, respectively, of the other portion 18, and the diameters of the circles formed by said portions being progressively decreased by the movement of the portions 18 from each other, as shown in Figures 2 and 3. The portions 18 are connected to each other by yielding means to hold the mating faces of the flanges 19 in engagement with each other and urge the portions longitudinally from each other, said means comprising a pair of coil springs 22 engaged on leg portions 23 integrally connected at one end to the flanges 19 at the ends 21 of the portions 18, as at 24, and extending in spaced relation to and in the plane of the flanges 19, the opposite free ends of the leg portions terminating within the ends 20 of the members 18, so that the opposite ends of the springs abut the ends 24 of mating leg portions 23, as shown in Figure 3.

The expansible member is mounted under compression of the springs 22 on the upper end of the leg sections 10 engaged in the leg sections 9, which upper end is closed by a plug 25 engaged in the bore of the leg sections 10 and secured therein by pins or screws 26, the plug having an enlarged head portion 27 of greater diameter than the outer diameter and abutting the end of the leg sections 10 and is of slightly smaller diameter than the bore of the leg sections 9 to facilitate the sliding engagement thereof with the leg sections 10 in the leg sections 9, as shown in Figure 2. The expansible member is mounted and held under compression on the head portion 27 of the plug with the end 20 of one portion 18 contacting the head portion 27 and the end 21 of the other portion 18 spaced from said head portion 27 by a member adjustably mounted in the plug 25, and comprising a shank 28 having screw threads 29 at one end adjustably engaged in a screw threaded opening 30 extending centrally through the plug 25, 27 and the opposite end of the shank arranged with a head in the form of a disk 31 secured on said end of the shank in a suitable manner and shown in the present instance as providing the disk 31 with a center square opening for the engagement of a corresponding square portion on the end of the shank below a head integral with the shank and abutting the upper surface of the disk 31, as shown at 32 in Figures 2 and 3. The diameter of the disk head 31 is substantially equal to the bore of the leg sections 9 to permit sliding movement of the head therein, and in the normal position of the expansible portions 18 on the plug head 27, the shank 28 is adjusted in the plug 25 to position the portions 18 under the force of the springs 22 to form a circle having a diameter less than the diameter of the bore leg of the sections 9, as shown in Figure 3, whereby the leg sections 10 may readily be engaged and slidably adjusted in the leg sections 9.

After the leg sections 10 have been adjusted in the leg sections 9 to form with said leg sections 9 tripod supporting legs of a desired length, the leg sections 10 are secured in the leg sections 9 by rotating the leg sections 10 in a direction to screw the shank 28 into the plug 25, the shank being held against rotation by the springs 22 applying a canting action on the disk head 31 through the expansible portion 18 having the end 20 thereof engaging the under face of the disk head. The screwing of the shank 28 into the plug 25 will move the expansible portion 18 having the end 20 engaging the disk head 31 and the end 21 spaced from the plug head 27 longitudinally toward said plug head 27 and thereby increase the diameter of the expansible member and impinge said member against the wall of the bore of the leg sections 9, as shown in Figure 2. To release the leg sections 10 from the leg sections 9 and permit adjustment of the leg sections 10 longitudinally of the leg sections 9 to vary the lengths of the tripod supporting legs, the leg sections 10 are rotated in the opposite direction to screw the shank 28 out of the plug 25 under the force of the springs 22 and permit the expansible portions 18 to assume their normal position shown in Figure 3, when the leg sections 10 may be slidably adjusted in the leg sections 9.

To increase the frictional contact between the expansible member and the bore of the leg sections 9 when said expansible member is adjusted to expanded position into impingement with the wall of the bore of the leg sections 9, the leg sections are of a different material than the material of the expansible member. Satisfactory results have been obtained by making the leg sections of aluminum tubing and the expansible member and the heads 27 and 31 of brass or bronze.

The leg sections 10 may readily be adjusted to any desired position in the leg sections 9 to vary the lengths of the legs formed by said sections, by rotating the leg sections 10 to release the expansible member from impingement with the bore of the leg sections 9, moving the leg sections 10 longitudinally of the leg sections 9 to the desired position, and secured in adjusted position by rotating the leg sections 10 to spread the expansible member into impingement with the bore of the leg sections 9, so that the adjusting of the leg sections and the securing of the leg sections in adjusted position is accomplished by the same hand of the user.

In the present illustration of the invention, the leg sections 10 are shown to have an outer diameter less than the diameter of the bore in the leg sections 9 and the head 27 on the leg sections 10 and the space formed by said difference in diameters between the sections of the same leg is closed by a ferrule 48 screw threaded onto the lower end of the leg sections 9 and slidably engaged on the leg sections 10, as shown in Figures 1 and 2. The necessity of the ferrule 48 may be overcome by providing leg sections 10 of the same outer diameter as the heads of the plugs 25.

Having thus described my invention, I claim:

1. In a tripod supporting leg, including telescoping sections, an expansible member comprising a plurality of like portions of arcuate shape in cross section adjustably mounted on the end of a leg section engaged within an associated leg section and yieldingly urged longitudinally of each other to normally circumscribe a circle having a diameter slightly less than the diameter of the bore of the associated leg section in which it is engaged and adapted to be adjusted to position to circumscribe a circle having a diameter greater than the diameter of the bore of said associated leg section by the rotation of the first leg section on which said expansible member is mounted and cause the expansible member to impinge on the surface of the bore of the associated leg section and secure the leg sections in predetermined adjusted position.

2. In a tripod supporting leg including a plurality of telescoping sections, an expansible and contractible member comprising a plurality of like portions of arcuate form in cross section yieldingly connected to each other and normally positioned to circumscribe a circle less than the diameter of the bore of a leg section in which the expansible member is adapted to engage, and a member adjustably connected to and mounting the expansible member on the end of a second leg section to be engaged therewith in the bore of the first leg section, and said adjustable member arranged with a portion engaging the outer end of the like portions of the expansible member and to frictionally engage the surface of the bore of the first leg section in which it is engaged and by the rotation of the second leg section to which it is connected in one direction adapted to adjust said adjustable member toward and co-operate with the end of the second leg section to expand and impinge the like portions of the expansible member against the surface of the bore of the first leg section in which it is engaged and lock the leg sections against telescoping movement, the rotation of said second leg section in the opposite direction actuating said adjustable member away from the end of the second leg section and permitting the portions of the expansible member to move to normal position and release the leg sections to have longitudinal adjustment one relative to the other.

3. In a tripod supporting leg including a plurality of tubular leg sections one slidable within the other, means to lock the leg sections against longitudinal movement one relative to the other comprising a plurality of like members of arcuate shape in cross section having mating faces extending in an oblique plane longitudinally of said members adapted to form a cylindrical body the circumference of which is adapted to be varied by the longitudinal adjustment of said members relative to each other, and a member adjustably connected at one end to the end of a leg section and having a head at the opposite end adapted to engage an end of the arcuate members and mount said members on the end of said leg section to be engaged therewith in an associated leg section, and the head of said member by the rotation of said leg section to which it is connected in one direction adapted to co-operate with the associated leg section in which it is engaged to cause adjustment of the adjustable member toward the end of the first leg section and effect longitudinal movement of the arcuate members relative to each other and impinge said members against the surface of the bore of the associated leg section in which said members are engaged and secure the leg sections against longitudinal movement.

4. In a tripod supporting leg including telescoping like sections, means to releasably lock said leg sections against longitudinal movement comprising a plurality of like members of arcuate form in cross section having longitudinal mating faces extending obliquely of the axis thereof to permit longitudinal adjustment of said members relative to each other and vary the circumference formed by said members, springs connecting and urging said members to a position of smallest circumference, a member including a shank extended through and having a head at one end abutting an end of said members and adjustably connected at the opposite end to and mounting said members on an end of a leg section to be engaged therewith in an associated leg section, and the shank head by the rotation of the first leg section to which it is connected cooperating with said members to effect adjustment of the shank member relative to said first leg section and longitudinal adjustment of said members against the action of the springs and impingement thereof with the surface of the bore of the associated leg section in which said members are engaged and thereby lock the leg sections against longitudinal movement relative to each other.

5. Means for releasably locking telescoping sections of tripod supporting legs against telescoping movement as claimed in claim 4, wherein the head of the shank member is of a diameter corresponding to the diameter of the bore of the associated leg section in which it is engaged, whereby the shank is held against rotation by engagement of the shank head with an end of the arcuate members under the influence of the springs and effect adjustment of the shank member relative to the first leg section to which it is connected by the rotation of said first leg section.

6. Means for releasably connecting telescoping sections of tripod supporting legs against longitudinal movement as claimed in claim 4, wherein the head of the shank member comprises a disk fixed to an end of the shank and of a diameter corresponding to the diameter of the bore of the associated leg section in which it is engaged, and the opposite end of the shank arranged with a screw thread having threaded connection with a screw threaded bore in a plug fixed in the end of the first leg section.

7. Means for releasably locking telescoping sections of a tripod supporting leg against longitudinal movement as claimed in claim 4, wherein the mating longitudinal faces of the like arcuate members are arranged with legs extending in the plane of said faces and said legs at the face of one member being disposed in opposed relation to and extending in a direction opposite to the legs at the face of the other member, and the springs consist of coil springs engaged upon opposed legs of said members.

8. Means for releasably locking telescoping sections of a tripod supporting leg against longitudinal movement as claimed in claim 4, wherein the mating faces of the like arcuate members are arranged on flanges extended inwardly from the longitudinal marginal portions of said members, and legs arranged at the marginal portion of said flanges with the legs of one member extending in a direction opposite to the legs of the other member, and the spring urging the members to predetermined position consist of coiled springs engaged upon the legs of opposed flanges.

HERMAN NEUWIRTH.